US 6,705,635 B2

(12) United States Patent
Hoeft et al.

(10) Patent No.: US 6,705,635 B2
(45) Date of Patent: Mar. 16, 2004

(54) APPARATUS AND METHOD FOR RAPIDLY FASTENING AN AIRBAG APPARATUS

(75) Inventors: David E. Hoeft, Clawson, MI (US); James Hoskyns, Lake Orion, MI (US); Robert F. McGee, Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/920,260

(22) Filed: Aug. 1, 2001

(65) Prior Publication Data

US 2003/0025307 A1 Feb. 6, 2003

(51) Int. Cl.⁷ .............................................. B60R 21/22
(52) U.S. Cl. ................. 280/728.2; 280/730.2; 411/107; 411/156; 411/339
(58) Field of Search .......................... 280/730.2, 728.2; 411/338, 339, 174, 175, 107, 155, 156

(56) References Cited

U.S. PATENT DOCUMENTS

| | | | | |
|---|---|---|---|---|
| 1,945,005 A | * | 1/1934 | Vacher | 411/134 |
| 5,687,453 A | * | 11/1997 | Megregian et al. | 16/221 |
| 5,772,380 A | * | 6/1998 | Cloud et al. | 411/508 |
| 5,775,724 A | | 7/1998 | Tonooka | |
| 6,119,546 A | * | 9/2000 | Steffens, Jr. | 74/552 |
| 6,120,056 A | | 9/2000 | Ryan | |
| 6,161,865 A | | 12/2000 | Rose | |
| 6,171,039 B1 | * | 1/2001 | Seurujarvi | 411/148 |
| 6,222,123 B1 | * | 4/2001 | Schwarz | 174/60 |
| 6,231,068 B1 | * | 5/2001 | White, Jr. et al. | 280/728.2 |
| 6,234,515 B1 | * | 5/2001 | Iwanaga | 280/728.2 |
| 6,260,878 B1 | * | 7/2001 | Tanase | 280/730.2 |
| 6,309,132 B1 | * | 10/2001 | Jakob et al. | 403/200 |
| 6,431,585 B1 | * | 8/2002 | Rickabus et al. | 280/728.3 |
| 6,540,251 B1 | | 4/2003 | LeVey et al. | |

FOREIGN PATENT DOCUMENTS

EP      1138558 A2 * 10/2001 ........... B60R/21/20

* cited by examiner

*Primary Examiner*—Paul N. Dickson
*Assistant Examiner*—Laura B. Rosenberg
(74) *Attorney, Agent, or Firm*—James D. Erickson; Sally J. Brown

(57) ABSTRACT

An attachment assembly for attaching a cushion member for an airbag apparatus to a vehicle surface is disclosed. The attachment assembly is particularly useful for attaching curtain type cushion members, as for a side impact airbag system. The attachment assembly may include a protrusion with a rod and a knob larger than the rod. A compressible spring washer is affixed to the rod. A hole formed in a mounting portion of the cushion member is then fitted around the rod, outside the washer. A cap is affixed to the rod to keep the cushion member in place. The protrusion, with the attached cushion member, may then be affixed to the vehicle surface through the use of a keyhole formed in the vehicle surface. The knob is pushed longitudinally into a larger, clearance portion of the keyhole, such that the spring washer is compressed. Then, the protrusion is moved transversely into an engaged configuration, in which the knob and the spring washer engage the interference portion. The protrusion can be locked in place to form a locked configuration by providing an arcuate slot intersecting the keyhole, into which the washer fits. Alternatively, upraised tabs may be formed around the keyhole, such that the spring washer slides over the upraised tabs and locks into place abutting them. As another alternative, a locking tab may be formed in the washer in such a position that the locking tab can rest within the clearance portion to resist motion of the protrusion into the clearance portion.

41 Claims, 5 Drawing Sheets

APPARATUS AND METHOD FOR RAPIDLY FASTENING AN AIRBAG APPARATUS

BACKGROUND OF THE INVENTION

1. The Field of the Invention

The present invention relates to attachment methods. More specifically, the present invention relates to a novel method and system for attaching an inflatable cushion for an airbag to an interior surface of a vehicle.

2. The Relevant Technology

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield. Side impact airbags have also been developed in response to the need for similar protection from impacts in a lateral direction, or against the side of the vehicle.

However, despite their enormous lifesaving potential, airbags have typically been limited to certain vehicles and configurations. In part, these limitations are a result of the limited methods that have been available for fastening the cushion member to an interior surface of the vehicle. For example, according to known methods, a hole may be formed in the fabric near the seam of the cushion member and aligned with a hole formed in an interior surface of the vehicle. A fastener, such as a bolt, may then be threaded through both holes to mount the airbag in place.

Many parts of a vehicle interior have little room to accommodate the airbag cushion material. The added bulk of fasteners such as bolts, screws, rivets, and the like often exceeds the available space at a location, so that the airbag must be positioned at a less desirable location. The head of the fastener keeps the airbag from folding evenly and compactly in its compartment. This is especially problematic in the case of side impact airbags, in which folding space is tightly constrained. Some more compact vehicles simply do not have the space to accommodate the bulk of certain airbags, such as side impact airbags.

Yet further, previously-known airbags are somewhat difficult to install. Often, several steps are required. For example, an airbag may need to be aligned and held in position over the vehicle surface. Then, fasteners such as screws or bolts may need to be threaded through the proper holes and tightened. The tightening process may require that an operator use considerable care to tighten each fastener to the appropriate load. The entire process may require that multiple installers take several minutes, working together, to install each unit.

In addition, ergonomic issues often arise with threaded fasteners due to the fact that the installer must hold the airbag with one hand and a tool with the other. Often, the installer must move into an awkward position to use the tool in conjunction with the airbag. Upon tightening the threaded fastener, the airbag material tends to rotate under the torque exerted by the tool. As a result, additional anti-rotation devices must often be utilized during installation to keep the airbag in the proper orientation.

Even among non-threaded fasteners, many known devices must be oriented with some care before they can provide effective fastening. As a result, installation personnel must not only keep the cushion member properly aligned with the vehicle surface, but must simultaneously rotationally align the fastener with its mating portion of the vehicle surface.

Furthermore, some known fasteners require access to a rear portion of a vehicle surface in order to effect attachment. For example, bolt/nut combinations and the like may require that the cushion member be attached to the vehicle surface prior to assembly of the vehicle, so that installation personnel can access both sides of the vehicle surface to complete the attachment. The result is that assembly of the vehicle may need to be delayed to accommodate installation of the cushion member.

Known fastening methods also tend to add to the cost of airbag manufacturing and installation. If damage is discovered anywhere in the airbag assembly, it is likely that the entire assembly will have to be scrapped. The stringent specifications for airbag manufacturing may require that fasteners not be reconnected because an unacceptable level of damage to the airbag fabric may result.

Additionally, some existing fasteners have surfaces that rub undesirably against each other during operation of the vehicle, so that squeaks, rattling, or other disconcerting sounds are produced. Such sounds may, for a common consumer, be interpreted as indicia of poor vehicle quality, even though the airbag cushion has been properly installed.

Other fasteners are not easily removable. After deployment of an airbag, it may be desirable to replace the cushion member just in case the cushion member has become weakened or otherwise unusable as a result of deployment. However, some fasteners make the replacement process unnecessarily difficult and expensive. Screws and bolts, for example, may tend to strip the interior threads of a hole, so that the hole must be re-tapped prior to installation of a new airbag. Specialized replacement or servicing parts may also be required.

Perhaps the most severe deficiency of known fastening methods is the heightened danger of airbag malfunction due to installation errors, material defects, or design errors. In the case of threaded fasteners, tightening the fasteners to the proper load is often a critical step because too much tightening can damage the cushion member, the fastener, or the vehicle surface, thereby raising the possibility of an airbag malfunction. It is easy for a tight-fitting fastener to abrade or even begin to sever the fabric material during and after assembly. With threaded fasteners, the fabric of the airbag around the hole is compressed, undesirably twisted, and possibly damaged when the bolt is screwed into place. This increases the chances that the airbag will fail to deploy properly. If the fastener is not sufficiently loaded, the cushion may come loose during the explosive force of inflation, and deploy at a location where it can fail to protect a passenger or even cause injury.

Even if the problems described above occur only in one installed airbag out of every several thousand, the one faulty airbag may be the cause of serious injury. As a result, it is critical that more reliable and error-free fastening systems and methods be discovered. Fastening systems and methods with greater ease of assembly and removal could also save lives by making airbags less expensive and more widely available.

Accordingly, a need exists for a novel apparatus and method of attaching a cushion member for an airbag assembly to a vehicle surface. Such an apparatus and method should preferably operate without significantly damaging the airbag fabric, so that the reliability of the airbag system is maintained and a minimum of labor material is wasted on scrapped parts. Furthermore, such an apparatus and method should be compact, so that the airbag cushion member maybe tightly folded. Yet further, the apparatus and method should be easy to install, so that installation costs are reduced and the possibility of installation error is minimized. Preferably, such a fastener should be engageable with a minimum of orientation adjustment.

Still further, a need exists for a novel attachment apparatus and method that does not produce noise during operation of the vehicle. The method and apparatus also should not require access to any rear portion of an attachment surface. Furthermore, such a method and apparatus should preferably be easily removable so that damaged or used cushion members may be conveniently removed and replaced.

BRIEF SUMMARY OF THE INVENTION

The apparatus of the present invention has been developed in response to the present state of the art, and in particular, in response to the problems and needs in the art that have not yet been fully solved by currently available cushion attachment systems. Thus, it is an overall objective of the present invention to provide an apparatus and method for securely fastening a cushion member to a vehicle interior, with a higher degree of economy, time efficiency, safety, and overall effectiveness than was possible with prior art systems.

To achieve the foregoing objective, and in accordance with the invention as embodied and broadly described herein in the preferred embodiment, a novel attachment assembly is provided. The attachment assembly may operate to affix a mounting portion of a cushion member to a vehicle surface, such as may be located on a roof rail, for attachment of a curtain-type side impact airbag. Additionally, an attachment assembly according to the present invention may have a protrusion, a washer, and a cap. The vehicle surface may have an opening with a keyhole shape, and the mounting portion of the cushion member may have a circular hole properly positioned for assembly with the protrusion, washer, and cap.

The protrusion may comprise a proximal end and a distal end, with a rod extending from the proximal end to the distal end. The protrusion may also comprise a knob affixed or integrally formed at the distal end of the rod. The knob has a larger cross section, by comparison with the rod. The protrusion may be formed of any suitable material, such as a plastic, metal, ceramic, or composite. Metals may, however, provide unique advantages related to attaching the protrusion to other parts of the attachment assembly. More specifically, materials such as magnesium alloys, aluminum alloys, and selected steels may be weldable through a vibrational process known as orbital welding.

The washer is preferably a spring washer, and may have a slightly conical or otherwise bent shape. A hole centrally located in the washer is sized to fit around the rod. The conical shape permits the washer to act as a spring under compression, providing a restorative force. The washer may also be beneficially constructed of a metallic material. The cap preferably has a disc shape with a radius larger than the hole in the mounting portion. The cap may also be constructed of a metallic material for easy attachment to the rod.

The opening preferably has a keyhole shape, with a clearance portion sized to permit entry of the knob, and an interference portion too narrow to permit passage of the knob. The opening preferably also has a locking feature formed in close proximity to keep the washer positioned over the interference portion, thereby ensuring that the knob is not jarred or shaken toward the clearance portion. The locking feature may comprise an arcuate slot configured to receive a portion of the washer, or may comprise tabs upraised from the vehicle surface so as to abut the washer. In either form, comparatively simple tooling may be used to remove the washer from the locking feature and remove the cushion member.

According to another alternative embodiment, the locking feature maybe positioned on the washer. More specifically, the washer may be somewhat rectangular in shape, and may have a locking tab that protrudes toward the opening. The washer may have a kinked or otherwise bent shape so that the washer presses against the vehicle surface to keep the protrusion in tight The locking tab may be positioned to rest within the clearance portion when the protrusion is seated in the interference portion of the opening. The locking tab may then interfere with the clearance portion so that the protrusion is unable to move from the interference portion to the clearance portion.

The washer with an integrated locking feature may also have other features designed to facilitate removal of the washer and the protrusion from the opening. More specifically, the washer may have a lift tab positioned proximate the locking tab so that a user can remove the locking tab from the clearance portion by exerting pressure on the lift tab. A grip tab may also be provided on the opposite side of the washer from the lift tab, so that a user can exert pressure parallel to the opening while lifting the lift tab to move the protrusion into the clearance portion.

In any embodiment, the attachment assembly may be manufactured and assembled with comparative ease. If desired, the protrusion, washer, and cap may first be installed on the mounting portion of the cushion member. Then, the knob may be inserted into the keyhole and locked in place.

If separately manufactured, the knob and rod may be attached together by welding, threaded engagement, or any suitable method. The washer may be attached to the rod, between the distal and proximal ends, by interference fitting, orbital welding, thermal welding, some form of mechanical attachment, or the like. The proximal end of the rod may then be extended through the hole of the mounting portion. The cap may then be affixed to the proximal end of the rod by a method known in the art to sandwich the mounting portion between the cap and the washer. The cap and washer provide non-damaging contact surfaces for the fabric because they contain no sharp edges or other features that would damage the fabric, and compressive force against the fabric is dispersed over an area large enough to avoid damage.

Since none of the preceding steps require the presence of the vehicle surface, they may be carried out remote from the automobile, for instance, at a remote manufacturing facility. Then, the cushion member, with the attached protrusion, washer, and cap, may be affixed to the vehicle surface.

In order to complete mounting of the cushion member on the vehicle surface, the protrusion may first be inserted into the keyhole such that the knob enters the clearance portion. Due to the conical or curved shape of the washer, the rim of the washer contacts the vehicle surface around the cushion portion. The knob may be pressed further into the clearance portion by exerting pressure against the cap to flatten the washer.

When the knob has moved a sufficient distance into the opening, the protrusion may be drawn parallel to the opening to move the rod into the interference portion. The interference portion is then effectively sandwiched between the washer and the knob, such that significant movement of the rod further into the opening or out of the opening is precluded. When the rod has fully moved into the interference portion, the locking feature operates to effectively lock the washer, and thus the protrusion, in place.

If configured as an arcuate slot, the locking feature may receive a portion of the rim of the washer to effect locking. As the washer moves over the interference portion, the edges of the washer are continually pressed in toward the vehicle surface, by virtue of the restorative force of the washer. Thus, as the washer slides over the arcuate slot, once a corresponding arcuate portion of the rim is aligned with the arcuate slot, the rim slides into the slot so that locking occurs.

If the locking feature takes the form of upraised tabs, the tabs simply force the washer to deform somewhat more to slide over them, as the rod is moved into the interference portion of the keyhole. Once the rim has passed over the tabs, the rim snaps into engagement with contact surfaces on the tabs. The contact surfaces face toward the interference portion so that the washer is locked in position over the interference portion.

If the locking feature is a locking tab on the washer, the locking tab may slide against the vehicle surface until the protrusion seats against the interference portion. The locking tab may then snap into place within the clearance portion if the washer has been oriented such that the locking tab is aligned with the clearance portion. If the washer is not oriented such that the locking tab is aligned with the clearance portion, the washer may be rotated so that the locking tab slides in an arcuate path along the vehicle surface until it is able to snap into engagement with the clearance portion.

Such a locking feature maybe comparatively easily disengaged so that the protrusion can be removed from the opening. A user may simply grasp the lift tab and the grip tab, pulling the lift tab away from the opening to remove the locking tab from the opening. While the locking tab is out of the opening, a user may push the washer along the opening, in the direction of the clearance portion, until the protrusion can be withdrawn through the clearance portion.

Thus, the present invention provides an inexpensive attachment assembly for an airbag apparatus. The attachment assembly permits rapid and relatively error-free installation of the cushion member to a vehicle surface. According to preferred embodiments, the rod and knob are radially symmetrical, so that they can be freely rotated about their longitudinal axis without affecting engagement or locking of the attachment assembly. Consequently, one step of the installation process is removed because the installers need not properly orient the knob with the opening, but may simply insert the knob and rod into the opening, compress the washer, and slide the protrusion into locked engagement with one rapid motion.

As a result, the chances of faulty installation are decreased markedly, and the mounting portion of the cushion member is protected from tears, scraping, or other damage that may result from twisting fasteners. The compressive action of the spring washer keeps the attachment assembly firmly in place to reduce audible squeaks and rattling. Furthermore, installation personnel need not have access to the space behind the vehicle surface, so there is a great deal of flexibility concerning the stage of automobile assembly at which the cushion member is installed. Additionally, the attachment assembly is compact, so that a cushion member may be affixed in a wide variety of vehicles and configurations.

These and other objects, features, and advantages of the present invention will become more fully apparent from the following description and appended claims, or maybe learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

Sturdy, and yet non-damaging attachment of fabrics to hard surfaces can be somewhat problematic, especially when the fabric must be thin and compact, and yet must bear a load, such as the tensile load imposed on a cushion member by gas pressure. The type of compression applied by most known fasteners is potentially destructive to fabrics, such as the fabric of an airbag cushion. This is because the comparatively soft fabric is compressed between hard surfaces, and then is often subject to a high degree of tensile, or stretching, force applied between the hard surfaces. Shearing stresses are especially great when the hard surfaces slide with respect to each other, as when a bolt or screw is tightened, a clamp is slid into place, or some similar operation takes place.

The soft, compressed fabric is pulled in opposite directions by the hard surfaces. Under such conditions, the already weakened fibers readily tear. Tearing is made even more likely by holes formed in the fabric, which tend to localize stresses and form tears that propagate outward from the hole.

The present invention provides a method and apparatus by which stresses in a fabric can be spread relatively evenly throughout the fabric during attachment, so that tears and stretched or weakened portions are less likely to form. Twisting motions that might produce undesirable tensile or shear stresses in the fabric are avoided in favor of simple, comparatively uniform compression.

Additionally, airbag installation presents a need for fasteners that are self-registering, and yet compact, inexpensive, tightly-engaging, and removable. "Self-registering" refers to an assembly in which the various parts fit together in such a way that it is clear when they are properly assembled, and when they are not. Conventional threaded fasteners, for example, are not self-registering because there is no palpable event that occurs to show that the fastener has been tightened sufficiently. Thus, it is easy for a person to over-tighten or under-tighten such a fastener. With a self-registering fastener, however, a person knows the parts have been properly positioned when they snap into place, reach the limit of their relative motion, or the like.

The present invention, in certain embodiments, provides an attachment assembly that is fully self-registering during installation in a vehicle. Thus, it is nearly impossible for installation personnel to improperly attach a cushion member when such an attachment assembly is utilized. As a result, the safety and reliability of airbags is enhanced. Although the method and apparatus presented by the present invention is particularly useful for side impact airbags, application to other restraint devices, such as driver side and passenger side front airbags and knee bolsters, is also envisioned.

Figure 1:
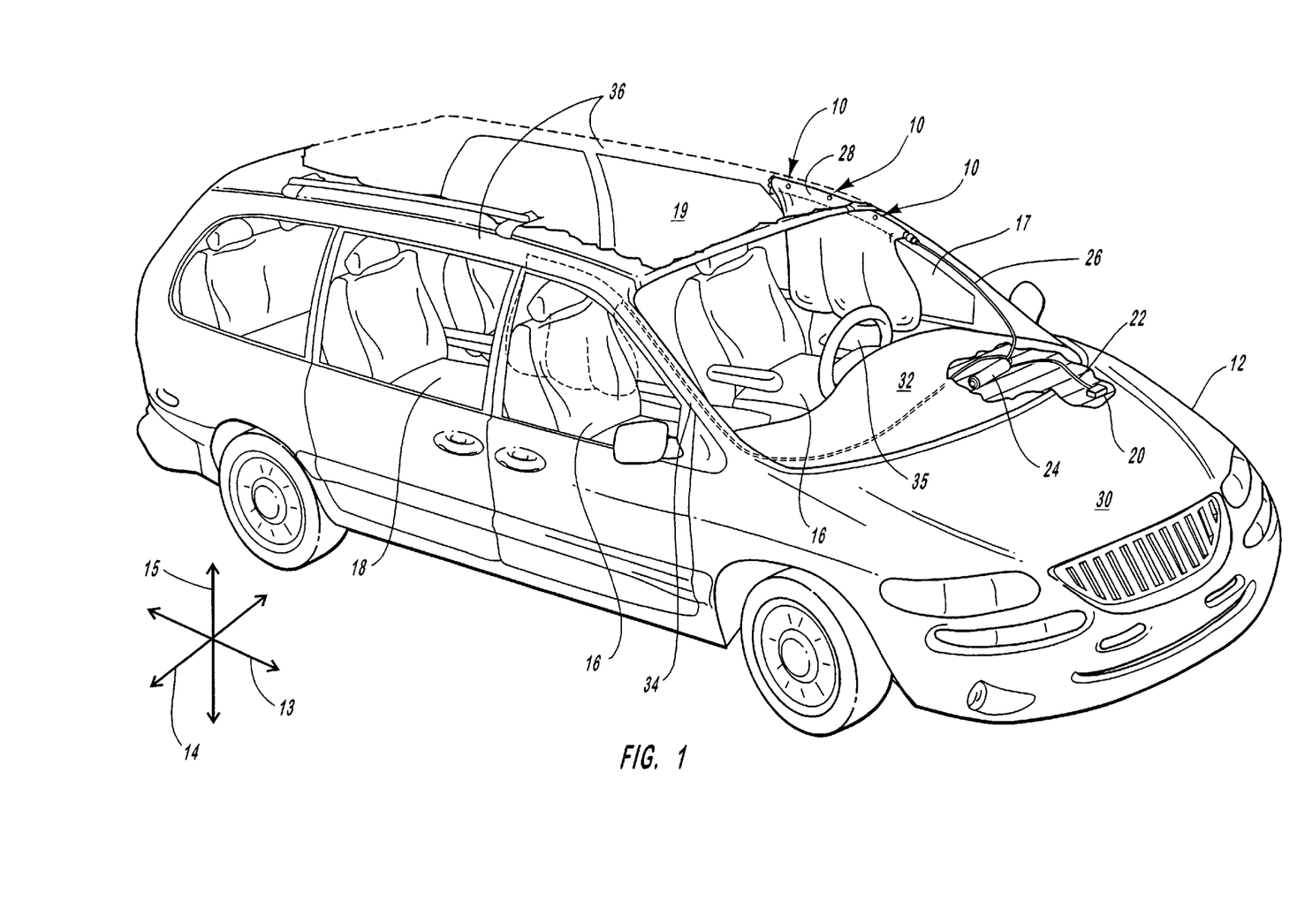
FIG. 1 is a perspective view of a vehicle incorporating an airbag apparatus suitable for attachment with the attachment assembly of the present invention.

Referring to FIG. 1, one possible embodiment of an attachment assembly 10 according to the present invention is shown installed in a vehicle 12. The vehicle 12 has a longitudinal direction 13, a lateral direction 14, and a transverse direction 15. The vehicle 12 further has front seats 16 laterally displaced from a first lateral surface 17, or front door 17, as shown in the vehicle 12 of FIG. 1. The vehicle 12 also has rear seats 18, laterally displaced from a second lateral surface 19, or rear door 19, as depicted.

An accelerometer 20 detects sudden lateral acceleration (or deceleration) of the vehicle 12, and transmits an electric signal via an electric line 22 to a source 24 of pressurized gas. The source 24 may take the form of a canister 24 of chemically reactive material that initiates a rapid pressure surge in the canister 24 upon application of electricity. In the alternative, the source 24 may simply store gas in a highly-pressurized state, or may have some combination of pressurized gas and chemical propellant. The expanding gases travel through a supply tube 26 to inflate a cushion member 28 situated between an occupant and an intruding object such as the front door 17. The entire process occurs with such rapidity that, before the vehicle has fully reacted to the impact, the cushion member 28 has inflated to protect the occupant from impact against the intruding object or the front door 17.

The accelerometer 20 and canister 24 can be stowed along a rear, central, or front portion of the roof rail, or within an engine compartment 30 or dashboard 32 as depicted in FIG. 1, to keep them away from users who might tamper with them. The supply tube 26 may extend along or within a strut 34 framing the windshield 35 to reach the first cushion portion 28, which may be installed along a roof rail 36 over the front door 17. The attachment apparatus 10 maybe used to unobtrusively mount the cushion member 28 within the vehicle 12. A second cushion member (shown in phantom) may be installed on the passenger side of the vehicle 12, and attached using an apparatus similar to the attachment apparatus 10 depicted in connection with the driver's side.

Figure 2:
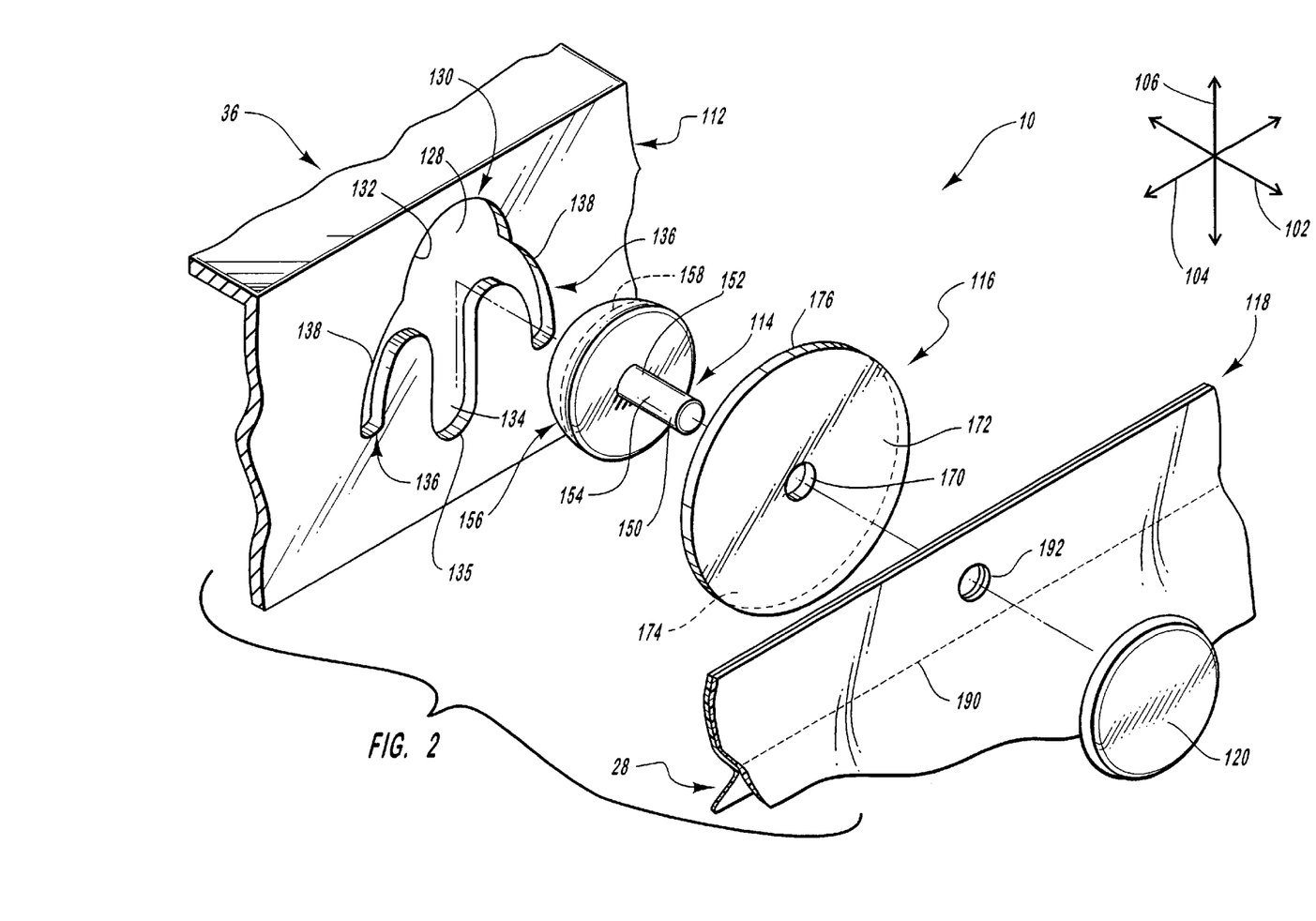
FIG. 2 is an exploded, perspective view of one embodiment of an attachment assembly according to the present invention, positioned to attach the cushion portion of FIG. 1 to a vehicle surface.

Referring to FIG. 2, an exploded view of one possible embodiment of an attachment assembly 10 according to the present invention is depicted. The attachment assembly 10 may have a longitudinal direction 102, a lateral direction 104, and a transverse direction 106. The attachment assembly 10 may have a vehicle surface 112, a protrusion 114, a washer 116, amounting portion 118 of the cushion member 28, and a cap 120.

The vehicle surface 112 is positioned inside the vehicle 12, at a location at which mounting of a cushion member is desirable to protect passengers. In the case of a side impact airbag, as depicted in FIG. 1, the vehicle surface 112 may comprise a lateral surface of one of the roof rails 36. Preferably, the vehicle surface 112 is roughly flat, and perpendicular to the longitudinal direction 102. The cushion member 28 may thus be attached to the vehicle surface 112 with the attachment assembly 10, folded tightly to the roof rails 36, and covered for unobtrusive operation. Alternatively, in the case of a driver's side or passenger's side airbag, the vehicle surface 112 may be located in a suitable compartment, in which the cushion member 28 is stored. For other airbag types, the vehicle surface 112 may similarly be located at a location selected for proper deployment and positioning of the cushion member 28.

Preferably, the vehicle surface 112 comprises a thin plate of material, behind which a cavity 128 is located. The cavity 128 preferably is in accessible to passengers of the vehicle 12, so as to prevent tampering with the attachment assembly 10. The cavity 128 may, for example, be formed by the interior of a roof rail 36 configured as a hollow beam or curved support.

An opening 130 is formed in the vehicle surface 112, and configured to receive and engage the protrusion 114. Preferably, the opening 130 takes the form of a keyhole 130 with a clearance portion 132 having a generally circular shape and an interference portion 134 with a more rectangular shape. "Clearance" refers to objects sized to permit respective motion, such as a hole large enough to receive a shaft without significant deformation of the shaft or hole. Conversely, "interference" generally refers to an object that is sized to block motion of another object with respect to it, such as a hole that is too small to accommodate a shaft without enlargement of the hole or compression of the shaft.

With continued reference to FIG. 2, the interference portion 134 may have a rounded or flat outer edge 135 positioned furthest from the clearance portion 132. The keyhole 130 may also have a locking feature designed to keep the protrusion 114 properly positioned and engaged within the interference portion 134. In the embodiment depicted in FIG. 2, the locking feature comprises an arcuate slot 136. The arcuate slot 136 has an outer edge 138 configured to receive the washer 116 in a manner to be described below.

In the alternative, the opening 130 may be differently configured. For example, the clearance portion 132 need not be circular, but may have any flat-sided or curved shape that will permit passage of the knob 156 with clearance.

Similarly, the interference portion 134 need not be a linear slot with parallel sides. The interference portion 134 may be crooked, curved, tapered, or otherwise shaped as desired, so long as the knob 156 cannot pass through the interference portion 134 with clearance in the longitudinal direction 102.

The protrusion 114 preferably has a proximal end 150 and a distal end 152. Preferably, a rod 154 extends from the proximal end 150 to the distal end 152. The rod 154 may be cylindrical in shape, as depicted in FIG. 2, or may have a flat-sided or otherwise curved cross-section, taken along the longitudinal axis of the rod 154 (extending along the longitudinal direction 102). The cross-section of the rod 154 need not be uniform, but may vary in size and shape. The rod 154 also need not be straight as shown in FIG. 2, but may be curved or kinked, or otherwise bent if desired. The rod 154 may be constructed of any suitably strong material, such as a metal, plastic, ceramic, or composite. However, the rod 154 preferably is constructed of a metallic material that can be vibrationally welded by a method such as orbital welding. Selected magnesium, aluminum, and steel alloys, for example, are weldable through vibrational methods.

Preferably, a knob 156 is attached at the distal end 152 of the rod 154. The knob 156 comprises a largest circumference 158 that is wider than the rod 154. The knob 156 may also have a circular cross-section, as depicted in FIG. 2, and may take the form of a cylinder with rounded edges. Alternatively, the knob 156 may also have a flat-sided or otherwise curved cross-sectional shape, with bends and/or cross-sectional variation as desired. The knob 154 and the knob 156 may integrally formed, or may be attached using any desirable method. For example, the knob 156 and the rod 154 could be friction welded, thermally welded, adhesive or chemically bonded, mechanically engaged through compliant connectors or threaded engagements, or the like.

The knob 156 is preferably sized to pass through the clearance portion 132, regardless of the rotational orientation of the knob 156 about the longitudinal axis. Additionally, the knob 156 is preferably large enough as to be unable to pass through the interference portion 134, regardless of the rotational orientation of the knob 156 about the longitudinal axis. The rod 154 is preferably narrow enough to pass through both the clearance portion 132 and the interference portion 134. Thus, the knob 156 maybe inserted through the clearance portion 130 in the longitudinal direction 102, and translated in the transverse direction 106 such that the knob 156 lies within the cavity 128, behind the interference portion 134. The rod 154 then extends outward from the interference portion 154.

The washer 116 preferably comprises a hole 170 sized to fit around the rod 154. The washer 116 maybe configured as a spring type washer with a conical or arcuate shape. Thus, the washer 116 comprises a convex surface 172 facing away from the vehicle surface 112, and a concave surface 174 facing toward the vehicle surface 112. A rim 176 around the washer 116 connects the concave surface 174 with the convex surface 172. Preferably, the washer 116 is also constructed of a metallic material similar to the material used for the rod 154, so that there is welding compatibility between the materials of the rod 154 and the washer 116. Additionally, the material used to form the washer 116 is preferably somewhat ductile, so as to permit deformation of the washer 116 in response to a compressive load.

Alternatively, the washer 116 may comprise any number of different configurations suitable for limiting passage of the rod 154 into the keyhole 130. For example, the washer 116 may have ridges, protrusions, or ripples. The washer 116 need not be circular, but may have any desired cross-sectional shape such as a polygon, an oval, an ellipse, or the like. However, the washer 116 is preferably configured to provide the restorative force of the washer 116 depicted in FIG. 2. The washer 116 may, for example, also comprise multiple members pressed apart by a linear spring. Alternatively, the washer 116 may comprise multiple conical or curved members positioned together to provide additional compressive force and/or displacement.

The mounting portion 118 of the cushion member 28 may simply comprise a strip along the top of the cushion member 28. The mounting portion 118 may, however, be differently configured, especially in the case of other types of airbags. Preferably, the mounting portion 118 is sealed from the remainder of the cushion member 28 in gas-tight fashion, for example, with a seam 190. Thus, gas is unable to leak from the mounting portion 118. The cushion member 28 may, for example, be made through lay flat construction, a method in which symmetrical fabric portions are stitched at the edges to form a flattened cushion.

The mounting portion 118 also may comprise a hole 192, shaped to receive the rod 154. If the rod 154 has a circular cross section, the hole 192 may also beneficially be circular in shape, so that the rod 154 rotates freely within the hole 192. However, the hole 192 need not be circular to accomplish the purposes of the invention. Thus, rotation of the rod 154 within the hole 192 is unable to induce any twisting in the fabric of the mounting portion 118. As a result, tensile and shear stresses in the fabric surrounding the hole 192 are reduced, and there is less chance of stretching, tearing, or other undesirable occurrences that may weaken the cushion member 28. If desired, the hole 192 may also be reinforced with a metallic bushing or other suitable annular attachment.

The cap 120 is designed to be affixed to the proximal end 150 of the rod 154 to keep the mounting portion 118 in position on the rod 154. Thus, the cap 120 may simply comprise a flat disc shape larger than the proximal end 150 of the rod 154, so that the cap 120 cannot pass through the hole 192. The cap 120 need not be circular, but may be flat-sided, or may comprise features such as recesses, threading engagements, or the like (not shown) to facilitate attachment to the proximal end 150. Preferably, the cap 120 is constructed of a metallic material compatible with that of the rod 154 for welding purposes, so as to enable fixation by vibrational welding.

The attachment assembly 10 of the present invention may be comparatively easily assembled and installed in a vehicle 12. One such method of assembly and installation will be described below, with reference to FIG. 2 and also to FIG. 3, which depicts the attachment assembly 10 in its fully assembled and installed configuration.

Prior to installation in a vehicle 12, the protrusion 114, washer 116, mounting portion 118, and cap 120 may be assembled at any suitable location, such as an assembly facility operated by the airbag manufacturer. The washer 116 may first be affixed to the rod 154. As depicted in FIG. 2, the washer 116 is preferably fitted over the rod 154, such that the proximal end 150 passes through the hole 170, and the concave surface 174 faces the knob 156.

The washer 116 may be positioned at a predetermined location on the rod 154, between the proximal end 150 and the distal end 152. Preferably, the concave surface 174, where it adjoins the rim 176, remains offset from the nearest surface of the knob 156 by a longitudinal 102 distance slightly less than the thickness of the vehicle surface 112. As a result, the washer 116 will have to deflect somewhat to permit full passage of the knob 156 into the cavity 128.

The washer 116 may be affixed to the rod 154 by any suitable method. For example, the hole 170 may be made tapered and/or somewhat smaller than the rod 154 so that an interference fit is produced. The rod 154 may have one or more features (not shown), such as an annular recess, designed to ensure proper positioning of the washer 116 on the rod 154. The washer 116 may also be chemically or adhesively bonded to the rod 154, thermally welded, attached through mating threads on the rod 154 and within the hole 170, or affixed through a variety of other methods appreciated by those skilled in the art.

However, the washer 116 is preferably vibrationally welded, through a process such as orbital welding, to the rod 154. This may be accomplished by, for example, fixturing the rod 154 and attaching a vibrator to the washer 116, or vice versa. The vibration induces friction in the contacting surfaces, and the friction produces localized heat to weld the contacting surfaces.

The proximal end 150 of the rod 154 may then be brought through the hole 192 in the mounting portion 192. Preferably, the hole 192 is not rigidly affixed to the rod 154, but is free to rotate thereon. The hole 192 is moved along the rod 154 until the mounting portion abuts the convex surface 172 of the washer 116.

The cap 120 may then be affixed to the proximal end 150 of the rod 154 by a method similar to that used to attach the washer 116 to the rod 154, as described above. If the proximal end 150 has a flattened surface, as with a cylindrical configuration of the rod 154, a corresponding central, flat surface of the cap 120 may simply be positioned adjoining the flattened surface of the proximal end. Relative vibration may be induced between the proximal end 150 and the cap, in a manner such as that described in connection with attachment of the washer 116 to the rod 154.

The rod 154 may, if desired, be constructed long enough so that the space between the convex surface 172 of the washer 116 and the cap 120 is larger than the thickness of the mounting portion 118. Thus, the protrusion 114, washer 116, and cap 120 may be freely rotatable, with respect to the cushion member 28, after attachment to the cushion member 28.

Alternatively, the rod 154 may be made shorter, such that the cap 120 compresses the fabric surrounding the hole 192 somewhat. Such compression is to be preferred over twisting, as would be induced by other types of fasteners, because it is comparatively uniform and has little tendency to tear or stretch the fabric. To the extent that any twisting force is produced by rotation of the washer 116 and cap 120, with respect to the cushion member 28, the stresses produced by such twisting motion are spread over the comparatively large surface area of the cap 120 and the convex portion 172 in contact with the mounting portion 118. Thus, stresses do not concentrate about the hole 192, which might otherwise serve as a focal point for tearing. The size of the cap 120 maybe effectively selected to appropriately spread stresses away from the hole, while still fitting within the volume allotted to the airbag.

Once the protrusion 114, washer 116, mounting portion 118, and cap 120 have been assembled and attached to the cushion member 28, the cushion member 28 maybe installed in a vehicle 12, for example, at an automaker's manufacturing facility. As depicted in FIG. 1, the cushion member 28 may have several attachment assemblies 10. However, these need not be simultaneously aligned with their respective keyholes 130, because each attachment assembly 10 is freely rotatable.

Thus, a person or machine installing the cushion member 28 may install each attachment assembly 10 separately. Each attachment assembly 10 may rotate to facilitate alignment of a neighboring attachment assembly 10 with its keyhole 130. Additionally, the knob 156 need not be rotated to any predetermined orientation about its longitudinal 102 axis prior to insertion in the keyhole 130. The knob 156 is symmetrical and will therefore lock in place regardless of its longitudinal 102 orientation.

The keyhole 130 may be formed through any number of methods. The vehicle surface 112 may, for example, be molded or stamped with the keyhole 130 already in place. Alternatively, the keyhole 130 maybe formed in the existing vehicle surface 112 by milling, stamping, laser cutting, water jet cutting, wire EDM cutting, or any other suitable method.

In order to install the cushion member 28, the knob 156 may first be inserted into the clearance portion 132 and maneuvered longitudinally 102 into the cavity 128. This may be accomplished simply by pressing against the cap 120 in the longitudinal 102 direction. Preferably, sufficient pressure is exerted against the cap 120 to flatten the washer 116 somewhat, so that the knob 156 passes completely through the clearance portion 132. Then, the knob 156 may be moved in the transverse direction 106 by, for example, applying transverse 106 pressure against the cap 120.

The compressed state of the washer 116 effectively keeps the knob 156 in abutting relation to the vehicle surface 112. The restorative force of the washer 116 tends to draw the rod 154 outward from the keyhole 130, thereby keeping the knob 156 in frictional engagement with the vehicle surface 112. As a result, the vibrations occurring during normal operation of the vehicle 12 do not cause the knob 156 or the rod 154 to squeak or rattle against the vehicle surface 112. Additionally, the compression of the washer 116 is useful for locking the attachment assembly 10 in the engaged configuration, in a manner to be described below.

When the knob 156 is positioned at least partially behind the interference portion 134, the attachment assembly 10 is in an engaged configuration because the knob 156 is unable to move significantly in the longitudinal direction 102 without first moving transversely 106, into alignment with the clearance portion 132. However, rotation of the knob 156 about the longitudinal 102 axis is still preferably possible in the engaged configuration. Preferably, the knob is moved transversely 106 until it rests behind the interference portion 134, and the rod 154 has moved along the entire length of the interference portion 134 to rest against the outermost edge 135 of the interference portion 134.

Figure 3:
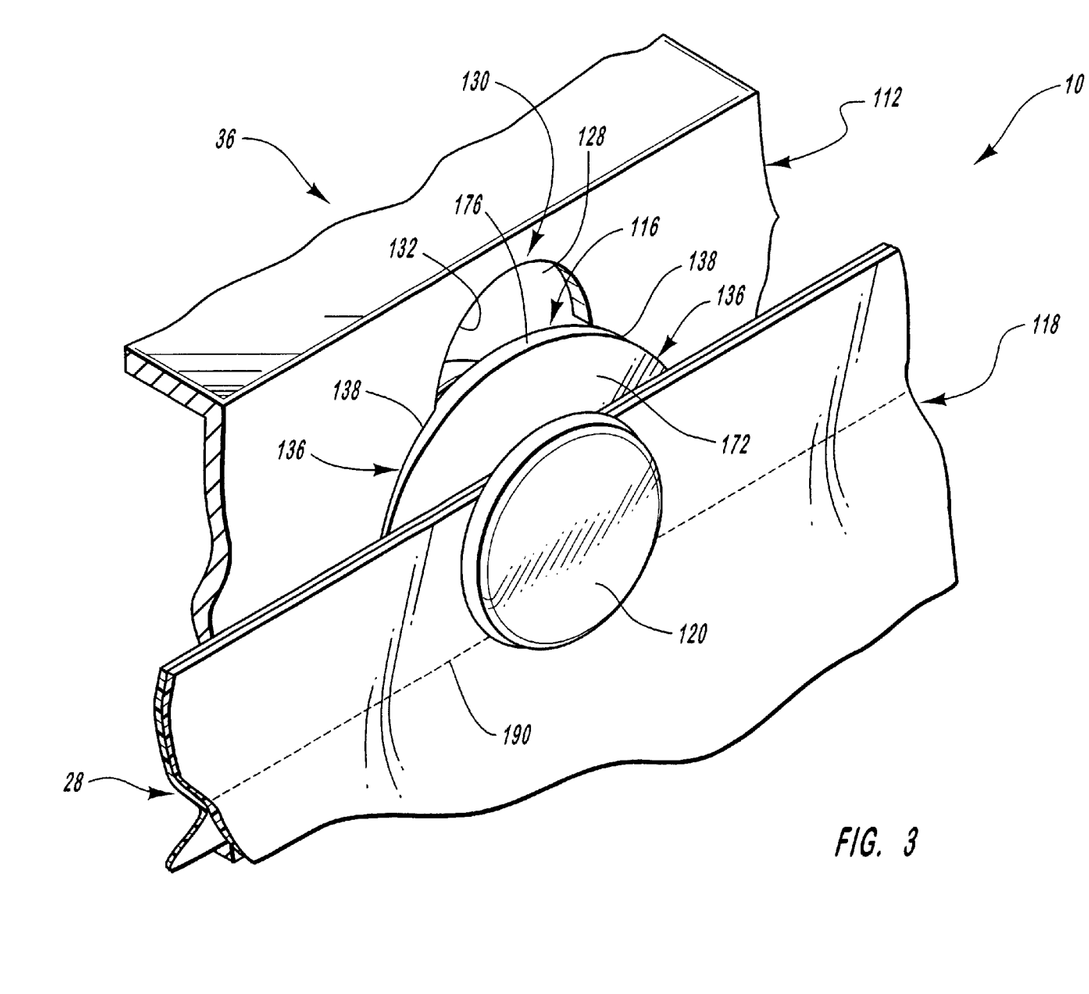
FIG. 3 is a perspective view of the attachment assembly of FIG. 2, with the protrusion locked within the opening.

When the rod 154 contacts the outermost edge 135, the locking feature preferably takes effect to keep the rod 154 against the outermost edge 135, and the knob 156 engaged behind the interference portion 134. In the embodiment of FIGS. 2 and 3, the locking feature takes the form of the arcuate slot 136. Preferably, the arcuate slot 136 has an outer edge 138 having a radius substantially the same as that of the washer 116, i.e., the same or slightly larger.

When the knob 156 moves in the transverse direction 106, the washer 116 slides along the vehicle surface 112 in a deflected (i.e., flattened) state. When the rod 154 reaches the outermost edge 135, a portion of the rim 176 of the washer 116 is positioned over the arcuate slot 136. As a result of the compressed state of the washer 116, the rim 176 presses against the vehicle surface 112, and therefore slides readily in the longitudinal direction 102 to enter the arcuate slot 136 when the rim 176 and the arcuate slot 136 are aligned. This engaged and locked configuration of the attachment assembly 10 is depicted in FIG. 3. "Engaged configuration" refers to the condition in which the knob 156 is unable to significantly move in the longitudinal direction 102, out of the cavity 128, but may still be able to move in the transverse direction 106. "Locked configuration" refers to the condition in which the knob 156 cannot move significantly in the longitudinal direction 102 or the transverse direction 106.

When the rim 176 is engaged within the arcuate slot 136, the attachment assembly 10 is in the locked configuration because the protrusion 114, washer 116, mounting portion 118, and cap 120 are unable to move in the transverse direction 106. The rod 154 cannot move further away from the clearance portion 132 because the rod 154 abuts the outermost edge 135 of the interference portion 134, and the rod 154 also cannot move toward the clearance portion 132 because the rim 176 abuts the outer edge 138 of the arcuate slot 136. Thus, the knob 156 cannot be aligned with the clearance portion 132 to permit motion in the longitudinal direction 102.

Even though locking in this fashion is secure, unlocking of the attachment assembly 10 maybe comparatively easily carried out through the use of simple tooling. For example, a thin-tipped tool, such as a screwdriver, may be inserted into the clearance portion 132 to pry the rim 176 out of the arcuate slot 136, so that the washer 116 can be moved toward the clearance portion 130. Thus, if the cushion member 28 deploys or becomes damaged, replacement of the cushion member 28 may be carried out with relative ease by unlocking and disengaging the attachment assembly 10, and then repeating the steps described previously to assemble and install a new cushion member 28.

During deployment of the airbag, the cushion member 28 may be pushed outward from the first lateral surface 17 by inflation. This pressure tends simply to tip the rim 176 of the washer 116 deeper into the arcuate slot 136, so as to further resist disengagement of the attachment assembly 10. Thus, the attachment assembly 10 is unlikely to disengage during deployment of the airbag, and the cushion member 28 will likely remain properly positioned for maximum protective effect.

Figure 4:
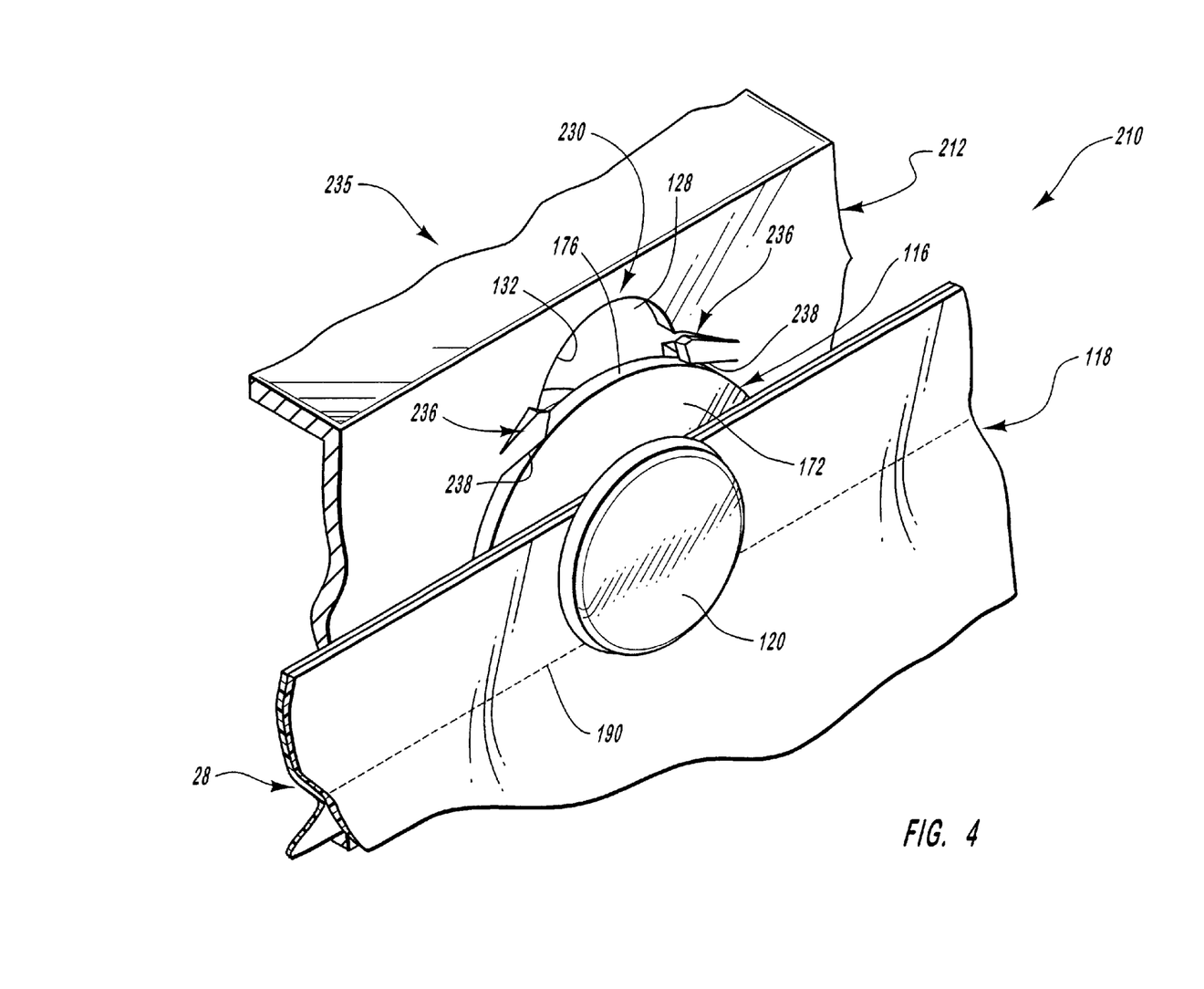
FIG. 4 is a perspective view of an alternative embodiment of an attachment assembly, having a different type of locking feature, with the protrusion locked within the opening.

Referring to FIG. 4, an alternative embodiment of the present invention is depicted and designated 210. The attachment assembly 210 may be used to affix a cushion member 118 to a vehicle surface 212 with an opening 230. The opening 230 may be formed in a roof rail 235. The attachment assembly 210 differs from the attachment assembly 10 in that, in the place of the arcuate slot 136, the locking feature takes the form of a pair of upraised tabs 236. The upraised tabs 236 maybe roughly rectangular, curved, or otherwise shaped to abut the rim 176 of the washer 116. The upraised tabs 236 may be created simply by making parallel cuts in the wall of the vehicle surface 212 to form rectangular sections, and bending the rectangular sections outward to form the upraised tabs 236.

Assembly of the attachment assembly 210 is similar to assembly of the attachment assembly 10 of FIGS. 2 and 3. The washer 116 is deflected to push the knob 156 fully through the clearance portion 130, and then the protrusion 114, washer 116, mounting portion 118, and cap 120 are moved in the transverse direction 106 until the rod contacts the outermost edge 135 of the interference portion 134. The washer 116, as utilized in the attachment assembly 210 of FIG. 4, may be required to undergo a higher degree of deflection in order to pass over the upraised tabs 236. The rim 176 of the washer 116 is then able to slip in the longitudinal direction 102, past the upraised tabs 236.

Like the attachment assembly 10, the attachment assembly 210 is then in the locked configuration because the rim 176 of the washer 116 abuts contact edges 238 of the upraised tabs 238, thereby keeping the washer 116 from moving in the transverse direction 106 toward the clearance portion 132. The washer 116 maybe unlocked by using a thin-tipped tool, such as a small screwdriver, to pry the rim 176 of the washer outward and over the upraised tabs 236, so that the washer 116 can move toward the clearance portion 132.

Figure 5:
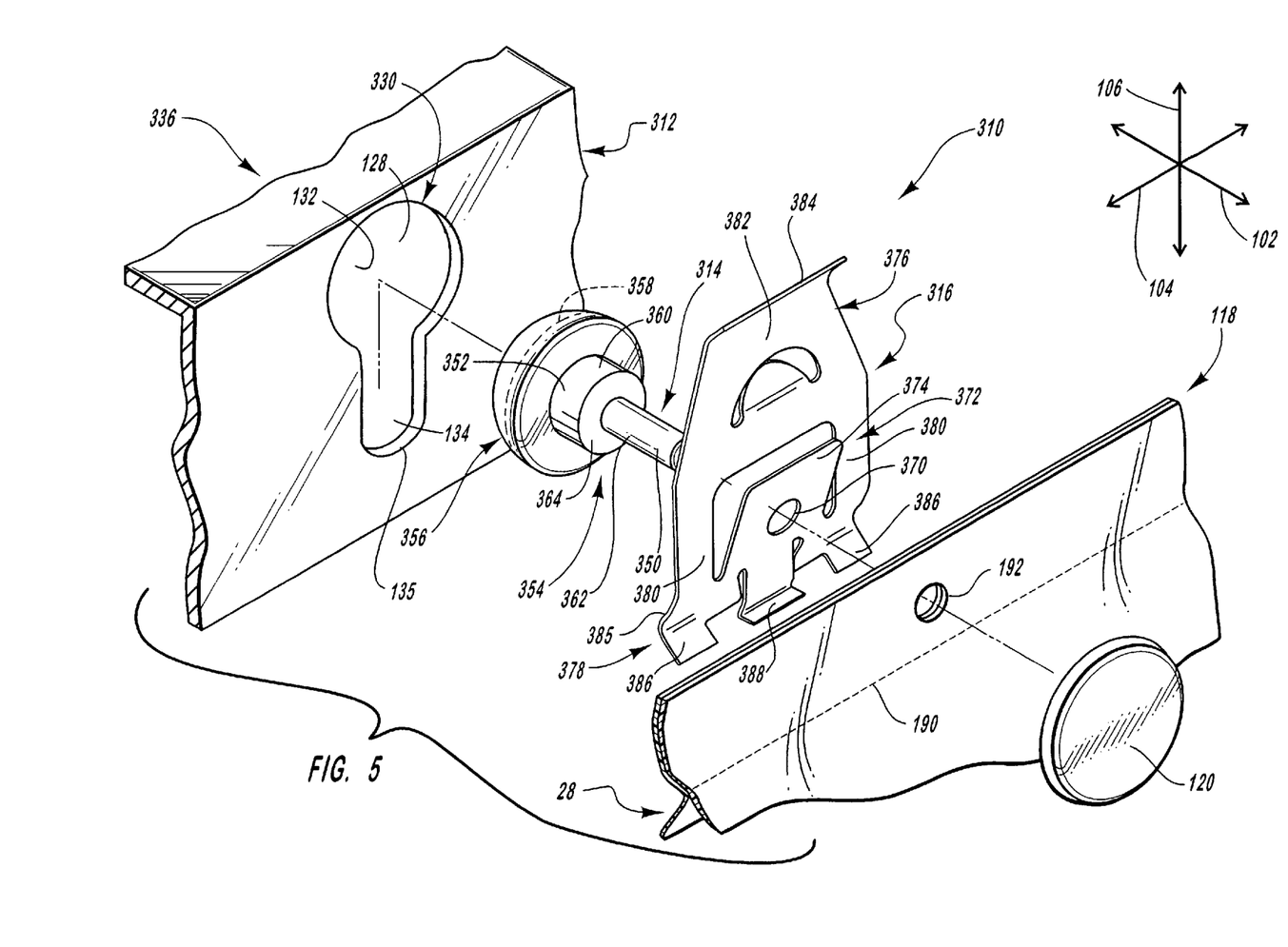
FIG. 5 is an exploded, perspective view of another alternative embodiment of an attachment assembly, with a locking feature attached to the washer, positioned to attach the cushion portion to a vehicle surface.

Referring to FIG. 5, another embodiment of an attachment assembly 310 according to the invention is shown. The attachment assembly 310 may have a vehicle surface 312, a protrusion 314, a washer 316, a mounting portion 118 of the cushion member 28, and a cap 120. The vehicle surface 312 may have an opening 330 with a keyhole-type shape, which may be positioned on a roof rail 336. As with the openings 130 and 230, the opening 330 may thus have a clearance portion 132 and an interference portion 134. The opening 330, however, may have no locking feature.

The protrusion 314 may have a proximal end 350 and a distal end 352. The protrusion 314 may also have a rod 354 and a knob 356 that are somewhat similar to the rod 154 and the knob 156 described previously. The knob 356 may have a generally round cross section, with a diameter larger than that of the rod 354; the knob 356 may have a largest circumference 358 sized to fit through the clearance portion 132, but not through the interference portion 134. The knob 356 depicted in FIG. 5 is not hemispherical or domed in shape, but is rather frustoconical. However, like the knob 156, the knob 356 may have a variety of different symmetrical or asymmetrical shapes.

The rod 354 may have an enlarged portion 360 adjoining the knob 356 and a narrow portion 362 toward the cap 120. An annular surface 364 may form a transition between the enlarged portion 360 and a narrow portion 362. The annular surface 364 may abut the washer 316 in the assembled state, and thereby register the position of the washer 316 with respect to the rod 354. The rod 354 may be solid like the rod 154 of FIG. 2, or may be hollow, as depicted.

The washer 316 may have a somewhat rectangular shape, and may be formed of a somewhat flexible material. The washer 316 may, for example, be constructed of injection molded plastic, an elastomeric substance, or the like. In one embodiment, the washer 316 fabricated by stamping a comparatively thin sheet of metal, such as steel or aluminum, into the proper configuration.

The washer 316 may have a hole 370 sized to receive the narrow portion 362 of the rod 354, but too small to accommodate the enlarged portion 360. The hole 370 may be positioned generally in a central portion 372 of the washer 316, and may be located on a central tab 374 of the central portion. The central tab 374 may be angled somewhat with respect to the remainder of the central portion 372 so that parts of the washer 316 extend toward the vehicle surface 312.

More particularly, the washer 316 may have a locking portion 376 on one side of the central portion 372 and an abutment portion 378 on the opposite side of the locking portion 376. The central portion 372 may have lateral extensions 380 extending on either side of the central tab 374 to connect the abutment portion 378 with the locking portion 376.

The locking portion 376 may have a locking feature 382 designed to interface with the opening 330 to keep the protrusion 314 in the engaged configuration when the attachment assembly 310 has been fully installed. The locking feature 382 may extend into the clearance portion 128 when the washer 316 abuts the vehicle surface 312 in the proper orientation, so that motion of the washer 316 in the transverse direction 106 is limited.

The locking feature 382 may, for example, take the form of a locking tab 382 extending from the washer 316. As mentioned previously, the washer 316 may be formed by stamping a comparatively thin sheet of metal; the locking tab 382 may be formed integrally with such a stamping process. Alternatively, the locking tab 382 maybe separately formed and attached to the remainder of the washer 316, or formed through the use of any other method. The locking tab 382 may rest within the clearance portion 132 when the protrusion 356 rests against the outermost edge 135 of the interference portion 134 and the washer 316 has been oriented as shown in FIG. 5.

The locking portion 376 may have a lift tab 384 located proximate the locking tab 382, so that a user can relatively easily deflect the washer 316 to remove the locking tab 382 from the opening 330. The lift tab 384 may also provide a comparatively gentle, rounded surface of the washer 316 to abut the vehicle surface 312.

The washer 316 may have a bent, folded, or kinked (substantially flat with a relatively sharp bend) configuration, and may more specifically have a kink 385 proximate the central portion 372. The kink 385 need not be positioned or configured as shown in FIG. 5, and indeed, need not be present in other washer configurations. However, in the configuration depicted in FIG. 5, the kink 385 separates the central portion 372 from the abutment portion 378.

The abutment portion 378, as well as the locking portion 376, therefore extends toward the vehicle surface 312. The abutment portion 378 may have abutment tabs 386 that extend away from the vehicle surface 316 to provide friendly engagement surfaces that will not cause scratching or binding during engagement with the vehicle surface 312. The abutment portion 378 proximate the abutment tabs 386 may be shaped to straddle the interference portion 134 so that the abutment portion 378 does not interfere with motion of the washer 316 in the transverse direction 106.

The abutment portion 378 may also have a grip tab 388 that extends in near-perpendicular fashion from the vehicle surface 312, so that a user can apply force against the grip tab 388 to move the washer 316 in the transverse direction 106. The grip tab 388 may be formed on a portion of the central tab 374 so that the grip tab 388 is offset from the vehicle surface 312 to avoid interference with the interference portion 134 during installation of the attachment assembly 310.

The attachment assembly 310 maybe assembled and installed in a manner somewhat similar to those described above, in connection with the attachment assemblies 10, 210 of the previous Figures. The rod 354 maybe inserted into the hole 370 until the annular surface 364 abuts the central tab 374; the rod 354 and the central tab 374 may then be affixed together through some type of chemical or adhesive bonding, interference fitting, thermal, frictional, or vibrational welding, fastening, or other attachment process. In the alternative, the washer 316 and the protrusion 314 may be integrally formed through die casting, injection molding, or a similar process.

The narrow portion 362 of the rod 354 may then be inserted through the hole 192 of the mounting portion 118. The cap 120 may be affixed to the narrow portion 362 in any of a variety of ways, such as those described above for attachment of the rod 354 to the washer 316. In any case, the mounting portion 118 is then sandwiched between the washer 316 and the cap 120.

The protrusion 314 may then be aligned with the clearance portion 132 and moved in the longitudinal direction 102 so that the knob 356 enters the cavity 128 through the clearance portion 132. As the knob 356 passes through the clearance portion 132, the locking portion 376 proximate the lift tab 384 and the abutment portion 378 proximate the abutment tabs 386 may come into contact with the vehicle surface 312. Thus, some deflection of the washer 316 is required in order to fully insert the knob 356 into the cavity 128. The knob 356 may then be moved in the transverse direction 106 to slide the rod 354 through the interference portion 134, until the rod abuts the outermost edge 135 of the interference portion 134.

If desired, the washer 316 maybe oriented prior to insertion of the knob 356 into the clearance portion 132. In such a case, the washer 316 may remain in the orientation depicted in FIG. 5 as the knob 356 moves behind the interference portion 134. As a result, the locking tab 382 may slide in the transverse direction 106 along the vehicle surface 312 toward the opening 330 while the knob 356 moves along a similar path through the interference portion 134. When the locking tab 382 is positioned over the clearance portion 132, the locking tab 382 may then snap, or slide, into place due to the pressure exerted by deflection of the washer 316.

In the alternative, the washer 316 may be allowed to remain in an arbitrary orientation when the knob 356 is inserted. Thus, when the rod 354 abuts the outermost edge 135, the locking tab 382 may not be aligned with the clearance portion 132. The washer 316 may simply be rotated about the axis of the rod 354 until the washer 316 substantially obtains the orientation shown in FIG. 5. Consequently, the locking tab 382 may slide in an arcuate path until the locking tab 382 is positioned over the clearance portion 132. The locking tab 382 may then snap into place within the clearance portion 132, as described above.

The attachment assembly 310 of FIG. 5 may also be relatively easily disassembled for repair or replacement of the cushion member 28. According to one method, a user may first lift the lift tab 384 away from the vehicle surface 312 by, for example, inserting one or more fingers between the lift tab 384 and the vehicle surface 312 and pulling the lift tab 384 outward. The locking tab 382 may thereby be removed from the clearance portion 132 to permit motion of the protrusion 314 toward the clearance portion 132.

The user may then utilize one or more fingers to press on the grip tab 388 in the transverse direction 106 to move the knob 356 into alignment with the clearance portion 132, while holding the lift tab 384 to keep the locking tab 382 out of the opening 330. Then, the user may pull the grip tab 388 and the lift tab 384 in the longitudinal direction 102 to draw the knob 356 out of the cavity 128, through the clearance portion 132. If desired, a user may perform the entire process using only a single hand. Despite the ease of disassembly, the attachment assembly 310 may remain secure and rattle free due to the deflection of the washer 316 and the resultant compression between the protrusion 314 and the inside of the vehicle surface 312.

The procedures described above for installing the attachment assemblies 10, 210, 310 to vehicle surfaces 112, 212, 312 are self-registering because noticeable events occur when the attachment assemblies 10, 210, 310 have reached the locked configuration. In each embodiment, the rod 154 or 354 cannot be moved too far in the transverse direction 106 because the rod 154 abuts the outermost edge 135 of the interference portion 134. Locking then occurs to prevent motion of the rod 154 back toward the clearance portion 132.

In the case of the attachment assembly 10, the rim 176 of the washer 116 slips into the arcuate slot 136. With the attachment assembly 210, the rim 176 snaps into contact with the main part of the vehicle surface 212 after sliding past the upraised tabs 236. The locking tab 382 of the attachment assembly 310 slides into the clearance portion 132 of the opening 330. In either case, a distinct event clearly notifies an installer that locking has occurred. Consequently, it is very difficult to accidentally install the attachment assemblies 10, 210, 310 improperly.

The attachment assemblies 10, 210, 310 of the present invention provide numerous advantages over the prior art. Through the elimination of twisting fasteners used to adjoin the airbag fabric to the vehicle 12, the number of airbags that fail to deploy properly, or must be scrapped prior to use, is greatly reduced. Additionally, less labor and tooling are required to install the airbags. The safety and production yield of the airbags are further enhanced by the ease of installation of the present invention. Self-registering installation methods ensure that installation errors are kept to a minimum.

Furthermore, installation personnel need not access the cavity 128, aside from insertion of the knob 156 or 356. Through the use of the locking features 136, 236, 382, locking of the attachment assemblies 10, 210, 310 is secure, yet reversible so that cushion members 28 can be replaced with relative ease. The restorative force of the washers 116, 316 ensures that the attachment assemblies 10, 210, 310 produce little or no sound that might disturb passengers inside the vehicle 12.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An attachment assembly for attaching an airbag apparatus to a vehicle surface, the attachment assembly comprising:
    a rod having a proximal end and a distal end, the rod extending between a mounting portion of a cushion member and a vehicle surface;
    a knob affixed to the distal end of the rod;
    a washer disposed on the rod between the mounting portion and the vehicle surface; and
    a keyhole shaped to receive the knob and to engage the knob to prevent withdrawal of the knob from the keyhole in an engaged configuration, wherein the knob is freely rotatable within the keyhole in the engaged configuration.

2. The attachment assembly of claim 1, wherein the keyhole is formed in the vehicle surface, and wherein the rod passes through a hole in the mounting portion.

3. The attachment assembly of claim 2, further comprising a cap affixed to the proximal end of the rod, wherein the cap and washer are dimensioned to interfere with the hole, so as to anchor the mounting portion between the washer and the cap.

4. The attachment assembly of claim 1, wherein the keyhole comprises:
    a clearance portion dimensioned to receive the knob with clearance; and
    an interference portion connected to the clearance portion and dimensioned to interfere with the knob, so as to engage the knob when the knob adjoins the interference portion, the interference portion being dimensioned to receive the rod with clearance.

5. The attachment assembly of claim 4, wherein the rod and the knob comprise a substantially circular cross section, taken perpendicular to a longitudinal axis of the rod.

6. The attachment assembly of claim 4, wherein the rod and the knob comprise a cross sectional shape chosen from the group consisting of polygons, ellipses, and ovals.

7. The attachment assembly of claim 4, wherein the vehicle surface comprises a locking feature configured to lock the knob in the engaged configuration.

8. The attachment assembly of claim 7, wherein the locking feature comprises one or more upraised tabs formed in the vehicle surface proximate the keyhole, wherein the upraised tabs are configured to abut the washer to restrict motion of the rod and knob toward the clearance portion of the keyhole.

9. The attachment assembly of claim 1, wherein the washer comprises a conical shape configured to urge the knob toward the keyhole, so as to hold the knob firmly against the vehicle surface in the engaged configuration.

10. An attachment assembly for attaching an airbag apparatus to a vehicle surface, the attachment assembly comprising:
    a rod having a proximal end and a distal end, the rod extending between a mounting portion of a cushion member and a vehicle surface;
    a knob affixed to the distal end of the rod;
    a washer disposed on the rod between the mounting portion and the vehicle surface; and
    a keyhole shaped to receive the knob and to engage the knob to prevent withdrawal of the knob from the keyhole in an engaged configuration, wherein the knob is freely rotatable within the keyhole in the engaged configuration,
    wherein the keyhole comprises:
        a clearance portion dimensioned to receive the knob with clearance; and
        an interference portion connected to the clearance portion and dimensioned to interfere with the knob, so as to engage the knob when the knob adjoins the interference portion, the interference portion being dimensioned to receive the rod with clearance 116,
    wherein the vehicle surface comprises a locking feature configured to lock the knob in the engaged configuration,
    wherein the locking feature comprises an arcuate slot intersecting the keyhole, an outer edge of the arcuate slot having a radius substantially the same as a radius of the washer, so as to receive the washer to restrict motion of the rod and knob toward the clearance portion of the keyhole.

11. An attachment assembly for attaching an airbag apparatus to a vehicle surface, the attachment assembly comprising:
    a cushion member comprising a mounting portion;

a protrusion comprising:
- a proximal end configured to be anchored to the mounting portion; and
- a distal end enlarged in relation to the proximal end;

a vehicle surface comprising an opening having a clearance portion and an interference portion, the clearance portion being sized to receive the distal end of the protrusion, the interference portion being sized to restrict motion of the distal end through the interference portion; and wherein engagement of the protrusion within the opening occurs independent of a rotational orientation of the protrusion about an axis perpendicular to the opening.

12. The attachment assembly of claim 11, wherein the opening comprises a keyhole.

13. The attachment assembly of claim 12, wherein the protrusion comprises a substantially circular cross section, taken perpendicular to a longitudinal axis of the protrusion.

14. The attachment assembly of claim 12, wherein the protrusion comprises a cross sectional shape chosen from the group consisting of polygons, ellipses, and ovals.

15. The attachment assembly of claim 11, further comprising a washer configured to be affixed around the protrusion and positioned between the vehicle surface and the mounting portion.

16. The attachment assembly of claim 15, wherein the washer comprises a spring type washer having a conical shape, the spring type washer being configured to urge the distal end to firmly abut the vehicle surface.

17. The attachment assembly of claim 16, wherein the vehicle surface comprises a locking feature configured to restrain motion of the washer along the opening, so as to hold the distal end in engagement with the interference portion.

18. An attachment assembly for attaching an airbag apparatus to a vehicle surface, the attachment assembly comprising:
- a rod having a proximal end and a distal end, the rod extending between a mounting portion of a cushion member and a vehicle surface;
- a knob affixed to the distal end of the rod;
- a keyhole shaped to receive the knob and to engage the knob to prevent withdrawal of the knob from the keyhole in an engaged configuration; and
- a washer disposed on the rod between the mounting portion and the vehicle surface, the washer having a locking feature configured to lock the knob in the engaged configuration.

19. The attachment assembly of claim 18, wherein the keyhole is formed in the vehicle surface, and wherein the rod passes through a hole in the mounting portion.

20. The attachment assembly of claim 19, further comprising a cap affixed to the proximal end of the rod, wherein the cap and washer are dimensioned to interfere with the hole, so as to anchor the mounting portion between the washer and the cap.

21. The attachment assembly of claim 18, wherein the keyhole comprises:
- a clearance portion dimensioned to receive the knob with clearance; and
- an interference portion connected to the clearance portion and dimensioned to interfere with the knob, so as to engage the knob when the knob adjoins the interference portion, the interference portion being dimensioned to receive the rod with clearance.

22. The attachment assembly of claim 21, wherein the rod and the knob comprise a substantially circular cross section, taken perpendicular to a longitudinal axis of the rod.

23. The attachment assembly of claim 21, wherein the rod and the knob comprise a cross sectional shape chosen from the group consisting of polygons, ellipses, and ovals.

24. The attachment assembly of claim 18, wherein the locking feature comprises a locking tab configured to extend into the keyhole to abut the clearance portion to restrict motion of the knob toward the clearance portion.

25. The attachment assembly of claim 18, wherein the washer is configured to be rotated in the engaged configuration to align the locking feature with the clearance portion.

26. The attachment assembly of claim 18, wherein the washer is configured to receive pressure from a hand of a user to remove the locking feature from the opening to permit removal of the knob from the engaged configuration.

27. The attachment assembly of claim 18, wherein the washer comprises a kinked shape configured to urge the knob toward the keyhole, so as to hold the knob firmly against the vehicle surface in the engaged configuration.

28. A method for attaching an airbag apparatus to a vehicle surface, the method comprising:
- providing a vehicle surface, a protrusion having a proximal end and a distal end, and a cushion member having a mounting portion;
- forming an opening in the vehicle surface, the opening having a clearance portion sized to receive the distal end of the protrusion and an interference portion sized to restrain motion of the distal end;
- anchoring the proximal end to the mounting portion;
- inserting the distal end of the protrusion into the opening; and
- moving the distal end of the protrusion into engagement with the interference portion, the engagement being independent of a rotational orientation of the protrusion about an axis perpendicular to the opening.

29. The method of claim 28, further comprising forming a locking feature on the vehicle surface.

30. The method of claim 29, further comprising moving the distal end into a locked configuration with respect to the locking feature, so as to resist motion of the distal end out of engagement with the interference portion.

31. The method of claim 28, further comprising providing a washer installed around the protrusion.

32. The method of claim 31, wherein inserting the distal end of the protrusion into the opening comprises:
- moving the distal end into the clearance portion until the washer abuts the vehicle surface; and
- pressing the distal end further into the clearance portion so as to deflect the washer until the distal end is positioned to slide behind the interference portion.

33. The method of claim 28, wherein forming the opening comprises forming a keyhole.

34. The method of claim 28, wherein anchoring the protrusion to the mounting portion comprises:
- providing a cap;
- forming a hole in the mounting portion;
- inserting the proximal end through the hole; and
- affixing the cap to the proximal end.

35. A method for attaching an airbag apparatus to a vehicle surface, the method comprising:
- providing a vehicle surface;
- providing a protrusion having a proximal end and a distal end;
- providing a cushion member having a mounting portion;
- providing a washer having a locking feature;

forming an opening in the vehicle surface, the opening having a clearance portion sized to receive the distal end of the protrusion and an interference portion sized to restrain motion of the distal end;

anchoring the proximal end to the mounting portion;

inserting the distal end of the protrusion into the opening;

moving the distal end of the protrusion into engagement with the interference portion; and rotationally aligning the washer with the opening such that the locking feature engages the opening to restrain motion of the distal end from the clearance portion.

36. The method of claim 35, wherein inserting the distal end of the protrusion into the opening comprises:

moving the distal end into the clearance portion until the washer abuts the vehicle surface; and pressing the distal end further into the clearance portion so as to deflect the washer until the distal end is positioned to slide behind the interference portion.

37. The method of claim 35, wherein forming the opening comprises forming a keyhole.

38. The method of claim 35, wherein anchoring the protrusion to the mounting portion comprises:

providing a cap;

forming a hole in the mounting portion;

inserting the proximal end through the hole; and affixing the cap to the proximal end.

39. A method for removing an attachment assembly from a vehicle surface having an opening with a clearance portion and an interference portion, the attachment assembly having a protrusion engaged within the interference portion and a washer positioned between the vehicle surface and a mounting portion of a cushion member, the washer having a locking feature extending into the opening to restrict motion of the protrusion into the clearance portion, the method comprising:

moving the washer to remove the locking feature from the opening;

moving the protrusion from the interference portion to the clearance portion; and withdrawing the protrusion from the opening.

40. The method of claim 39, wherein moving the washer to remove the locking feature from the opening comprises exerting pressure on a lift tab of the washer in a direction away from the opening.

41. The method of claim 40, wherein moving the protrusion from the interference portion to the clearance portion comprises exerting pressure on a grip tab of the washer to slide the washer with respect to the opening.

* * * * *